United States Patent [19]

Hargis

[11] Patent Number: 5,302,219
[45] Date of Patent: Apr. 12, 1994

[54] METHOD FOR OBTAINING VIA PATTERNS IN CERAMIC SHEETS

[75] Inventor: Billy M. Hargis, Chattanooga, Tenn.

[73] Assignee: Coors Electronic Package Company, Chattanooga, Tenn.

[21] Appl. No.: 679,722

[22] Filed: Apr. 3, 1991

[51] Int. Cl.⁵ .............................................. B32B 18/00
[52] U.S. Cl. ................................... 156/89; 156/246; 264/61; 427/96
[58] Field of Search .................. 156/89, 246; 264/156, 264/60, 61, 67, 259, 254; 425/290; 427/96

[56] References Cited

U.S. PATENT DOCUMENTS

| | | | |
|---|---|---|---|
| 3,948,706 | 4/1976 | Schmeckenbecher | 156/89 |
| 3,999,004 | 12/1976 | Chirino et al. | 174/68.5 |
| 4,302,625 | 11/1981 | Hetherington et al. | 174/68.5 |
| 4,336,088 | 6/1982 | Heterington et al. | 156/89 |
| 4,430,365 | 2/1984 | Schaible et al. | 427/96 |
| 4,497,677 | 2/1985 | Sanada et al. | 264/67 |
| 4,559,193 | 12/1985 | Ogawa et al. | 156/89 |
| 4,648,179 | 3/1987 | Bhattacharyya et al. | 29/832 |
| 4,799,984 | 1/1989 | Rellick | 156/89 |
| 4,802,945 | 2/1989 | Opina | 156/247 |
| 4,861,646 | 8/1989 | Barringer et al. | 428/210 |
| 5,011,725 | 4/1991 | Foster | 156/89 |

Primary Examiner—Jan H. Silbaugh
Assistant Examiner—Christopher A. Fiorilla
Attorney, Agent, or Firm—Sheridan Ross & McIntosh

[57] ABSTRACT

A process for producing via patterns in a ceramic sheet which includes the steps of forming an array of vias and then selectively filling in at least a portion of the vias with a non-conductive filler material, such as a ceramic, to create a custom via pattern. The process is particularly useful for fabricating grid transformers and ceramic printed circuit boards. The present invention also relates to ceramic devices produced by the process, and a universal tool adapted for carrying out the process.

16 Claims, 1 Drawing Sheet

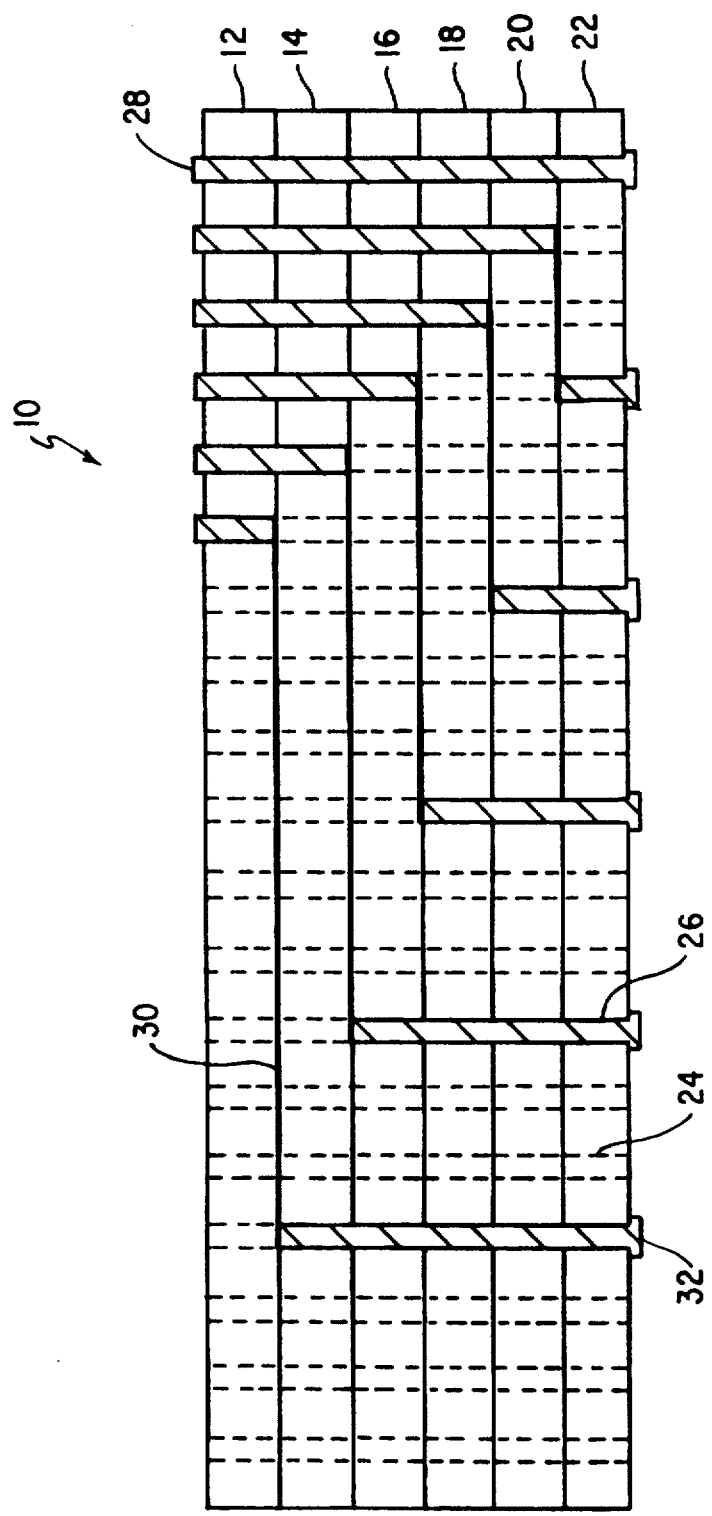

METHOD FOR OBTAINING VIA PATTERNS IN CERAMIC SHEETS

FIELD OF THE INVENTION

The present invention relates to a process for creating via patterns in ceramic sheets. More particularly, the present invention relates to a process for forming custom via patterns in ceramic sheets by initially forming substantially identical via patterns in the sheets and thereafter filling preselected vias with a substantially non-conductive material. The present invention also relates to ceramic products produced by this process, and a universal tool useful for practicing the process of the invention.

BACKGROUND OF THE INVENTION

The present invention relates to the fabrication of ceramic sheets, particularly ceramic sheets suitable for the production of multi-layer ceramic devices.

Multi-layer ceramic (MLC) devices are fabricated from a plurality of stacked ceramic sheets, wherein each sheet has a particular screened metal pattern on its planar surface and a particular pattern of feed-through vias, or holes. The vias in the ceramic sheets are usually filled in the unfired or "green" state with a slurry of metal paste. Screen printing techniques, through either a stencil or a screen, are typically used to force the metallizing paste into the via holes. After the patterned and via-filled layers are stacked in the proper order, they are laminated together with heat and pressure to form an aligned assembly ready for firing.

During the firing operation, the binder is volatilized from the ceramic tape, the patterned metallization and the via metallization. After binder removal, the temperature is increased to provide densification by sintering of the ceramic and metal portion of the assembly. The metal filled via hole now becomes an electrical conductor and provides the desired electrical interconnection between the various layers of patterned metallization.

MLC devices may be composed of a number of different layers. These layers may include a top surface for integrated circuit (IC) attachment and wire bonding, redistribution or "fan out" layers, signal distribution layers, power distribution layers, and bottom surface pads.

Vias permit electrical interconnection between the multiple layers. Vias may also act as heat sinks for heat generating components placed on top of the device, or as electrical grounds for the components. The vias are most commonly formed using a tool to mechanically punch the holes into the ceramic layers.

The present trend is toward larger ceramic printed circuit boards with increased interconnect density, that is, an increased density of vias. For example, five inch square modules are now commonly in use. A five inch square module having vias on a 25 mil grid will require 40,000 via holes. A "mil" is equivalent to 0.001 inch, or about 0.0254 mm. As used herein, the phrase 25 mil grid refers to an array of via locations, wherein each via is located approximately 25 mils, or 0.025 inch, from each adjacent via in the same row. This description applies herein to any "grid" preceded by a measurement reference. Other parts may require a higher density, such as vias on a 10 mil grid. The distance between adjoining vias may also be referred to as the "pitch." For example, a 10 mil grid has a finer pitch than a 25 mil grid. While most designs will not require solid grid vias, it is not uncommon to manufacture a grid having, for example, 12,000 vias on one surface.

Typically, at least one of the ceramic layers in the device will have a via pattern that differs from the via pattern in one or more of the other ceramic layers. Hence, separate punch tools, known as permanent cluster punch tools, must be fabricated for each different layer. Often, the MLC device will have in excess of five layers, each having a different via pattern. This requires the fabrication of multiple punch tools, which are relatively expensive. The fabrication of a separate punch tool for each layer can be prohibitively expensive, particularly when the multi-layer devices are produced for a customer in relatively small quantities.

One alternative is the use of programmable punches, wherein each individual layer pattern is programmed into a computerized punch and the punch fabricates each layer individually. These numerically controlled (NC) punches are presently available from several suppliers. Typically, the programmable punch apparatus has a single punch which can be activated at a speed of about 10 punches per second. Thus, with this machine, one layer of a 12,000 via part will require about 20 minutes to punch. In comparison, a full permanent cluster punch tool can operate at punching rates between about 3 and 30 seconds per layer, independent of the number of vias in the layer.

Another alternative is the use of a laser drilling apparatus. Again, productivity rate is a severe limitation of laser drilling techniques. The best laser drilling apparatus known to the inventor at the present time is rated at about 40 vias per second. Other problems with laser drilling include poor via quality and excess material deposition around the edges of the vias.

There is a need for an inexpensive and effective process for the formation of via patterns in individual layers, so that the fabrication cost of MLC devices can be reduced. Such a process would be particularly useful for low quantity production devices and devices that have a large number of individual layers with differing via patterns. It would be particularly advantageous if the process could be carried out using equipment that manufacturers of multi-layer ceramic devices typically have in their possession.

SUMMARY OF INVENTION

According to the present invention, a process for the formation of a via pattern in a ceramic sheet is provided.

In one embodiment, the via pattern is formed in a ceramic sheet by forming a plurality of vias in the ceramic sheet and then selectively filling in at least a portion of at least one of the vias with a substantially non-conductive filler material to form a desired via pattern.

In yet another embodiment, the filler material comprises a ceramic and may be in the form of a ceramic slurry. The ceramic is preferably selected from the group consisting of alumina, aluminum nitride, cordierite, mullite and beryllia, and in one embodiment comprises at least about 92 weight percent alumina.

Preferably, the ceramic sheet is formed by a tape cast process and the via pattern is mechanically punched into the sheet.

According to another aspect of the present invention, a process of fabricating a multi-layer ceramic device is provided. The fabrication of the device includes the step of forming a plurality of vias in a plurality of ceramic sheets and thereafter filling a portion of the vias with a ceramic slurry. The sheets are then metallized, stacked and sintered to form a multi-layer ceramic device. According to one embodiment, the device is a grid transformer. In another embodiment, the device is a multichip module.

The present invention also provides a ceramic sheet having a plurality of vias, wherein a portion of vias include a non-conducting material and at least a portion of the vias include a metallizing material. Preferably, the non-conducting material is a ceramic selected from the group consisting of alumina, aluminum nitride, cordierite, mullite and beryllia. The ceramic sheet may also have a portion of the vias that are substantially unfilled.

The present invention also provides a multi-layered ceramic device that includes a stack of ceramic sheets having vias, wherein at least some of the vias are filled with a non-conducting material and some of the vias are filled with a metallizing material. In one embodiment, the multi-layered ceramic device is a grid transformer and in another embodiment the device is a printed circuit board.

The present invention also provides a universal punch tool for fabrication of multi-layer ceramic devices, wherein the punch tool has a planar surface with a plurality of punch pins extending from the planar surface positioned such that substantially every via location in at least two of the ceramic sheets is punched in each of the two ceramic sheets, wherein the two ceramic sheets ultimately require different via patterns. In one embodiment, the punch tool punch pins form a substantially solid grid of vias.

BRIEF DESCRIPTION OF THE DRAWING

FIG. 1 is a cross-sectional view of a grid transformer according to the present invention.

DETAILED DESCRIPTION OF PREFERRED EMBODIMENTS

According to the present invention, desired via patterns are preferably obtained by selectively filling previously formed via holes with a non-conductive filler material, preferably prior to fabrication into a multi-layer ceramic device.

The vias not desired for routing purposes should be filled with a non-conductive filler, as opposed to a conductive material such as a metal. A via path that is metallized through the thickness of the multi-layer device will lead to metal "stubs" that may cause interference problems, particularly during high frequency applications. Further, when many vias are filled with a metallic material, that space is no longer available for planar routing of conductor paths.

Typically, ceramic sheets used in the production of MLC devices are formed by a tape casting process. The tape casting process includes the steps of casting a slurry onto a moving carrier surface, such as cellulose acetate, teflon, mylar or cellophane, and spreading the slurry to a controlled thickness with the edge of a blade. The cast slurry is then dried, resulting in a thin, flexible tape that can be cut or stamped to a desired configuration, such as square sheets.

The ceramic material used to form the flexible tape can be any ceramic material useful for forming MLC devices. Such materials include, but are not limited to, alumina, aluminum nitride, cordierite, mullite, and beryllia. Additionally, a low-temperature glass-ceramic composition may be used. Glass-ceramic compositions are particularly desirable since they can be easily tailored to yield specific properties, such as thermal expansion or dielectric constant. In one embodiment according to the present invention, the ceramic material in the tape includes at least about 92 percent alumina.

Additives are typically introduced into the slurry prior to casting to control the properties of the final tape. For example, deflocculants, solvents, binders and plasticizers may be added to the ceramic material to provide desirable flexibility and handling properties of the cast tape.

Although tape casting is a preferred method of fabrication, other methods for forming the ceramic sheet may be utilized in accordance with the present invention. For example, individual ceramic sheets may be dry pressed or a plastic ceramic body can be extruded through a narrow die to form a ceramic sheet. Ceramic tape can also be manufactured by a roll compaction process wherein a powder/binder mixture is fed through rollers having the desired gap between the rollers for thickness control.

The thickness of the ceramic sheet is determined by the total thickness required for cavity depths, handling strength, the number of metallized patterns required, and the electrical impedance limitations. To meet the separate requirements, compromises must often be made. In one embodiment according to the present invention, the tape layer thickness is between about 5 mils and about 40 mils.

After the ceramic sheet has been fabricated, the vias are then preferably formed in the sheet. Preferably, the vias are mechanically punched into the sheet. Registration holes to assist in the proper stacking of the sheets can also be punched at this time. The size of the via in the ceramic sheet is controlled by the size of the male punch and the female die opening. Most vias are round, since this is the lowest stress form and the least expensive punch to manufacture. The male punch is usually a "bed of nails" type made up of rods or pin punches extending from a planar surface, and having the desired diameter and location. The female die is a planar surface with holes matching the location of the male punches. The holes in the female punch are slightly larger than the male punches to provide alignment and clearance tolerances.

The male and female die blocks are aligned and are typically attached to a die set with precision alignment posts. This permits the male punch to cycle vertically over the female. The die set may then be placed in a mechanical or hydraulic press which forces the punches through the unfired ceramic tape.

To fabricate a via pattern the die is opened, a sheet of ceramic tape is inserted between the die blocks, and the male array of punches is forced through the tape, fracturing the tape and pushing slugs of tape into the female die.

Maximum via density can be obtained with minimum diameter vias. However, smaller punch diameters lead to a more fragile and expensive tool. Tight locational control and alignment of the male to female die is also required for decreasing via diameters, which increases the die cost.

Since ceramic materials are very abrasive, the die tooling is typically made from a carbide material to minimize tool wear. Tool wear can increase fabrication difficulty and the cost of permanent cluster punch tools. The cost of the tool is typically proportional to the number of punches in the tool.

The diameters of the vias can vary depending on the particular application and use for the via and for the device. The preferable diameter of the via is related to the thickness of the ceramic tape. Tape having a thickness greatly exceeding the pin-punch diameter is more difficult to punch, due to an increase in the likelihood of pin breakage. Further, it is difficult to force the paste completely through the vias when the via diameter is much smaller than the tape thickness. Alternatively, via diameters much larger than the tape thickness are difficult to handle after filling the vias, described hereinbelow, because the filling material may slump in the via while unsupported prior to drying. Most recently, increasing circuit density requirements are putting pressure on manufacturers to reduce via diameter.

Thus, the selection of the via diameter is often a result of compromise. In one embodiment, according to the present invention, the ratio of tape thickness to via diameter is between about 0.5 and about 2. The via diameter is preferably at least about 8 mil, but may be as low as 4 mils or 2 mils in diameter. When the via diameter is 2 mils, the tape should have a thickness between about 3 and about 4 mils.

According to the present invention, the number of punch tools necessary to form the ceramic sheets of the MLC device is minimized. Preferably, only one punch tool is necessary to produce the via pattern for all of the ceramic sheets for any particular MLC device. More preferably, one punch can be designed to produce via patterns for the various layers of a plurality of MLC devices.

To provide all of the vias for each layer of any given device, a "master" punch can preferably be fabricated for that particular device. The master punch includes a punch pin corresponding to each via location in any sheet used for the device.

In one embodiment, the punch locations on the tool are on a solid 10 mil grid. Thus, all the necessary vias for all the ceramic layers, are punched into each and every ceramic layer.

According to the present invention, once the grid of vias has been formed into the ceramic sheet, a preselected number of the vias, in preselected locations, are at least partially filled with a substantially non-conductive filler material, preferably a ceramic.

Preferably, the filler material includes the same ceramic material that is found in the bulk of the ceramic sheet. Any additives that effect the sintering characteristics of the ceramic, such as rare earth oxides, preferably remain the same. This is due to the desire to maintain the same thermal/mechanical properties, such as thermal expansion, between the ceramic sheet and the material filling the vias, thus minimizing stresses and micro-cracks. Micro-cracking in the finished device can lead to open circuits and otherwise defective products.

In a preferred embodiment, preselected vias are filled with ceramic slurry utilizing a screening process. In the screening process, a permeable screen, stencil, or mask is used that permits the ceramic slurry to pass through in desired locations when a squeegee is run over the top surface of the screen. The squeegee thus forces the slurry through selected areas of the screen and into the selected vias. Alternatively, a roller can be used in place of the squeegee to force the slurry through the screen, or a pressure via filling technique can be used.

Individual patterns for each layer can easily be formed in separate screens by techniques such as photolithography. In this process, a liquid emulsion is applied in sequential layers to a stretched screen until a smooth, uniform coat has been achieved. After drying, the emulsion is exposed to the photographic positive of the printing image. Areas of the emulsion exposed to light become hardened due to cross-linking of the polymer, but unexposed areas remain soft and are then washed out of the screen.

Thus, a screen pattern for each ceramic sheet that has a via pattern different than the master pattern can be easily and inexpensively fabricated. The screening process for filling the vias is especially advantageous, since most manufacturers of MLC devices have the necessary equipment on hand. Substantially the same equipment is used to apply metallization to the devices, as described more fully hereinbelow.

Once the selected vias are filled, the sheets are allowed to dry so that the filled vias retain adequate strength and do not crack or open when handled.

Once the sheets with filled vias have dried, metallization may be applied to both the surface and the remaining vias, as is known in the art. The via metallization can be applied prior to the surface metallization or can be applied in the same step.

Typically, the metallization is applied using a screen printing technique as described above. The metallizing paste might include tungsten, molybdenum, palladium, platinum, silver, gold, and the like, or mixtures thereof. The metallizing paste can optionally contain a filler, such as a ceramic material.

With high alumina ceramics, co-fired metallization is normally a refractory metal such as tungsten or molybdenum. The low temperature glass-ceramic co-fired systems can either use copper metallizing or low temperature metals such as silver and gold, or alloys such as platinum-silver and platinum-gold. The selection will depend on the atmosphere used for the sintering process.

The sequence of filling the unwanted holes with ceramic and filling the desired conductors with metallization is not critical to the present invention. It is preferred that all of the vias be filled prior to pattern surface metallization, because desired routing of the pattern, i.e., surface metallization, can include the area occupied by either or both of the ceramic- and metal-filled vias. Several vias on a layer can be combined into an electrical network and require common electrical pattern connecting the desired vias.

Further, while it is preferred that the vias be completely filled with a non-conductive filler or metallization, it is not required. It is possible to coat only the walls of the vias with a metal to achieve proper conductance. However, a filled via can provide a hermetic seal, minimizing the chance for internal voids, and provide a better surface for screen printing a metallization pattern. It can also be desirable to perform secondary operations on the via prior to pattern metallization to enhance the surface flatness. For example, shaving to remove excess via filling material or a press operation to compact and flatten the via material can be utilized.

In an alternative embodiment, at least a portion of the vias can be filled or partially filled with the metallization. Thereafter, a layer of ceramic, preferably having strong dielectric properties, can be coated over the end of a metal-filled via hole to substantially insulate the hole from electric conductance.

Where hermiticity of the device is not a factor, it is also possible that some vias may be left substantially unfilled. The paths requiring conductance can be filled with metallization, while at least a portion of the remaining vias remain unfilled. In this case, the unfilled via serves a purpose similar to that of a via that is filled with a non-conductive material. That is, it provides electrical insulation from the adjacent layer.

After the metallization has been selectively applied, the device is then preferably heated to dry the metallization paste. For example, the device may be dried at about 75° C. for up to 2 hours or more. Thereafter, the layers are carefully stacked into a lamination fixture and laminated together in a large, precision flat-plate press. During stacking, care must be taken to get every layer in its proper position and orientation in the stack. The lamination process may occur, for example, at about 90° C. (194° F.) and about 16.5 MPa (600 psi) pressure. In one embodiment, a formed lamination technique may be utilized. In this technique, cavity parts are stacked around the device to prevent tape flow into the cavity of the device during lamination. This permits the use of a "softer" tape formulation but requires tight tape thickness control and custom forms for each cavity size.

The layers thus laminated become an unfired or green laminated substrate. Prior to firing, portions may be cut from the laminated array to permit discarding of the border containing the alignment or index holes. The edges of the green laminates may be lightly sanded or otherwise smoothed to eliminate sharp corners and burrs. The unfired laminates are preferably inspected for contamination, voids, or other surface damage prior to sintering.

During the sintering cycle, the binders are broken down and volatilized and the metallization and ceramics sinter into a fully dense substrate. The furnace used can be either a continuous type or a periodic (i.e. batch) type. Preferably, the furnace is a continuous type for economic reasons. Typically, the oxygen level of the atmosphere in the furnace is controlled to burn out the binders contained in the ceramic sheets and prevent loss of oxides from the ceramic. At the same time, the atmosphere should be sufficiently reducing to prevent excessive oxidation of the metallization.

The substrate is typically sintered at between about 1450° C. and about 1650° C. for about 1 to about 4 hours to fully densify the device. The exact time and temperature will vary depending on the ceramic material and the refractory metal composition. For example, glass-ceramic materials will typically require lower sintering temperatures.

After firing, the MLC device can be plated with, for example, nickel, gold, or tin solder prior to further assembly.

The process of the present invention has been found especially useful for the fabrication of grid transformers. A grid transformer is a device for transitioning the fine pitch (e.g. tight grid) features of an integrated circuit device to a coarser pitch at the next level of interconnect. That is, a grid transformer can electrically spread a 10 mil grid that interfaces with an IC device, using reflow solder located on one surface of the ceramic part, to an expanded pitch fan-out more suitable to interfacing to the next layer of interconnect, such as a printed circuit board.

Thus, when the vias in the layers are all fabricated on a 10 mil grid and alternate "peripheries" of vias are filled on succeedingly lower layers, a "fan-out" of the electrical connections is economically achieved.

FIG. 1 depicts a cross-section through a simplified version of a grid transformer according to the present invention. The grid transformer 10 comprises a plurality of ceramic sheets 12, 14, 16, 18, 20, and 22 that are laminated and sintered together. The ceramic sheets include a number of vias that substantially line up over one another to form electrical communication paths through the grid transformer. Some of the vias 24 are filled with a substantially non-conductive material, such as a ceramic. Other vias 26 are filled with a metallizing material to form conductor paths through the device.

In the FIGURE, the vias are spaced from each other by approximately 10 mils from center to center, i.e. a 10 mil grid. The vias terminating at the top of the device contact the surface at pads 28 on a 10 mil grid. These pads 28 can then contact an integrated circuit device on a 10 mil grid. The conductor paths then descend into the device and distribute outwards on planar conductor paths 30. The planar conductor paths 30 terminate at a via located further out on the device and then descend vertically to a lower termination 32 by virtue of the inter-connected metallized vias.

Thus, the grid transformer 10 distributes a set of connections on a 10 mil grid at the top surface of a device to a 30 mil grid on the lower surface of the device. The lower surface pads 32 can then be used to more easily interconnect to other circuit devices due to the coarser pitch on its surface.

By building one tool that includes all of the via punches required to produce a solid 10 mil grid, as well as the rerouting vias on additional layers, it will be possible to greatly reduce the total tooling cost when compared to a plurality of separate individual tools for each layer. The actual number of tools replaced by the single common tool depends on the number of different via patterns in the given array and the commonality of the via locations.

Alternatively, two or more tools can be constructed to produce the multi-layer ceramic device. For example, the first tool can have a cluster of individual areas having pins on a 10 mil grid. This would produce a sheet having a "checkerboard" appearance of via locations. Thereafter, a tool having a substantially solid grid of punch pins on a coarser pitch, such as a 30 mil grid, can be stamped into the remaining sheets of the device. In this way, the number of vias that must be refilled in subsequent operations is minimized.

Another area where the process of the present invention results in significant utility is in the area of ceramic printed circuit boards, and in particular, multichip modules.

Multichip modules are circuit boards having a large number of chips on the top surface. A 6 inch square multichip module may have over 100 chips on its surface and the module may have up to 50 or 60 layers for interconnect purposes. Since multi-layer ceramic can accommodate a finer via pitch and interconnect density, fewer layers are necessary than, for example, when using an epoxy glass layer, or a thick film ceramic substrate that is not co-fired.

However, co-fired ceramic is traditionally not cost competitive with thick film, multi-layer ceramic interconnect boards produced at low volume, primarily because of tooling costs. The number of ceramic layers required to provide the desired interconnect density requires a large number of punch tools. The cost of a large number of separate punch-tools make co-fired ceramic highly undesirable except for the highest volume applications. The time constraints of the alternative low productivity processes, such as numerically controlled via punching, are also undesirable.

These problems make a universal solid grid tool very applicable to produce every ceramic layer on any size board, up to the maximum size of the tool.

The present invention is also useful for the speedy and efficient production of prototype multi-layer ceramic devices, produced for a perspective customer. Rather than producing separate punch tools for each prototype that a customer requests, the universal punch tool and process of the present invention can save money and time by producing prototypes at a low cost and with a very quick turnaround time. For example, punched ceramic tape can be stored and be ready to be customized for any project.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A process for fabricating a ceramic sheet for a multi-layer ceramic device, comprising the steps of:
   a) providing a ceramic sheet;
   b) forming a plurality of vias in said ceramic sheet; and
   c) filling at least a portion of at least one of said vias with substantially non-conductive filler material to provide electrical insulation through said at least one via whereby the remaining unfilled vias form a via pattern.

2. A process as recited in claim 1, wherein said filler material comprises a ceramic.

3. A process as recited in claim 1, wherein said filler material comprises a ceramic slurry.

4. A process as recited in claim 1, wherein said step of filling said vias includes the step of screen printing ceramic slurry onto said ceramic sheet.

5. A process as recited in claim 1, wherein said step of forming a plurality of vias comprises mechanically punching said vias into said ceramic sheet.

6. A process as recited in claim 1, wherein said ceramic sheet comprises a ceramic material selected from the group consisting of alumina, aluminum nitride, cordierite, mullite and beryllia.

7. A process as recited in claim 1, wherein said ceramic sheet comprises at least about 92 weight percent alumina.

8. A process as recited in claim 1, wherein said ceramic sheet is formed by a tape cast process.

9. A process as recited in claim 1, wherein said ceramic sheet comprises a glass-ceramic material.

10. A process for fabricating a multi-layer ceramic device, comprising the steps of:
   a) forming a plurality of vias in a plurality of ceramic sheets;
   b) filling at least a portion of at least one of said vias in at least one said ceramic sheets with a ceramic to provide electrical insulation through said at least one of said vias whereby the remaining unfilled vias form a via pattern;
   c) metallizing at least two of said ceramic sheets to form pattern surface metallization and to fill at least a portion of said plurality of vias with metallization;
   d) stacking said at least two ceramic sheets such that an electrical connection exists between said surface metallizations through said metallized vias; and
   e) sintering said stack of ceramic sheets to form a multi-layer ceramic device.

11. A process as recited in claim 10, wherein said device is a grid transformer.

12. A process as recited in claim 10, wherein said device is a multichip module.

13. A process as recited in claim 10, wherein said ceramic comprises alumina.

14. A process as recited in claim 10, wherein said step of forming a plurality of vias comprises mechanically punching a substantially identical pattern of vias into each ceramic sheet.

15. A process as recited in claim 10, wherein said step of forming a plurality of vias, comprises the steps of:
   (i) forming a first plurality of vias in a first ceramic sheet wherein said first plurality of vias are located on a cluster of substantially solid grids; and
   (ii) forming a second plurality of vias in a second ceramic sheet wherein said second plurality of vias are on a substantially solid grid having a pitch coarser than said substantially solid grids.

16. A process for producing a grid transformer, comprising the steps of:
   a) forming a plurality of ceramic tape layers;
   b) punching an identical via pattern into more than one of said ceramic tape layers;
   c) filling selected vias in at least one of said ceramic tape layers with a ceramic slurry;
   d) filling selected vias with metallization to form metallized vias;
   e) applying pattern surface metallization to at least a portion of said ceramic tape layers wherein said surface metallization corresponds to at least one of said metallized vias;
   f) laminating said ceramic layers together to form an unfired stack of ceramic layers such that after sintering an electrical connection exists between said pattern surface metallizations through said metallized vias; and
   g) sintering said ceramic layers to form a grid transformer.

* * * * *